Feb. 9, 1960   J. E. MARTENS   2,924,112
NUT ASSEMBLY

Filed Dec. 15, 1958   2 Sheets-Sheet 1

INVENTOR.
JACK E. MARTENS
BY A. D. McFadyen
W. E. Recktenwald
C. S. Penfold
ATTORNEY Feb. 9, 1960

J. E. MARTENS 2,924,112

NUT ASSEMBLY

Filed Dec. 15, 1958

INVENTOR.
JACK E. MARTENS

BY A. D. McFadyen
W. E. Recktenwald
C. S. Penfold
ATTORNEY

United States Patent Office 2,924,112
Patented Feb. 9, 1960

2,924,112

NUT ASSEMBLY

Jack E. Martens, Gary, Ind., assignor to The Anderson Company, a corporation of Indiana Application December 15, 1958, Serial No. 780,471

7 Claims. (Cl. 74—424.8)

This invention relates to a nut assembly and, more particularly, to an improved nut assembly for engaging a threaded member to provide a motion-transmitting device.

The nut assembly of the present invention is of the type embodying bearing elements which are carried in the assembly and rotatably engage the threads of a member or shaft during relative movement between the assembly and shaft. The instant nut assembly is characterized by its ease and economy of manufacture and simplicity of parts, and includes the feature of a simple ring fixed within the nut assembly intermediate the ends thereof which provides twice the conventional thrust-bearing surface for contact with the bearing elements.

In one form of the present invention, the interior of the nut member has axially spaced shoulder portions or abutment surfaces which are disposed radially of the shaft. Elongate bearing elements fit within the annular area between the nut member and the shaft, each element having a plurality of radially enlarged bearing surfaces to engage simultaneously both the nut member and the shaft. More particularly, these bearing surfaces engage the shoulder portions of both the nut member and the ring to limit relative axial movement between the nut member and the rotatable elements, and also interfit between the running helical thread of the shaft to engage a side of the thread. A cage interposed between the nut member and the shaft has openings to receive the bearing elements and space them peripherally about the shaft. Rotation or axial movement of either the nut member or the shaft produces endwise or rotational movement, respectively, to the other.

In the preferred form, the radially enlarged surfaces of the bearing elements are of toroidal shape to make substantially point-to-point contact with the threads of the shaft, with the inturned flange portions of the nut member, and with the ring by which rotation of the nut means may transmit axial movement to the shaft, or vice versa.

The accompanying drawings illustrate a presently preferred embodiment, wherein.

Figure 1:
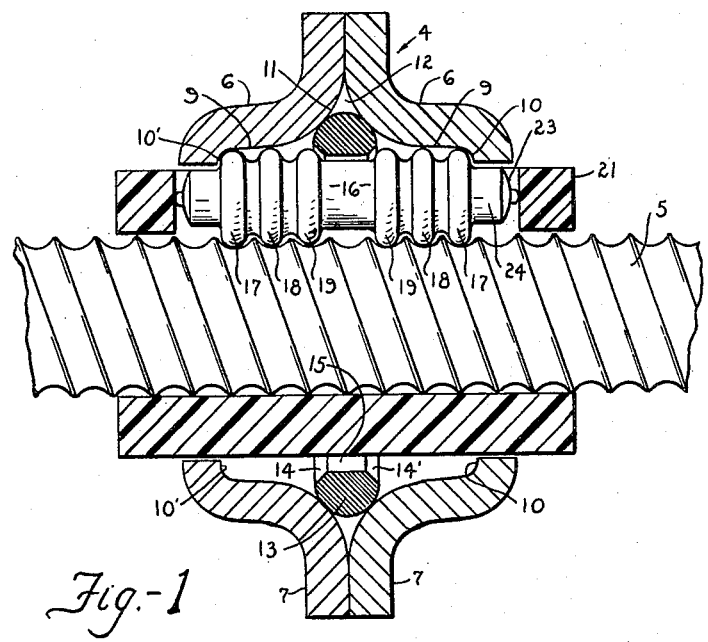
Figure 1 is a sectional view taken lengthwise of the nut assembly showing its engagement with a threaded shaft.
Figure 2:
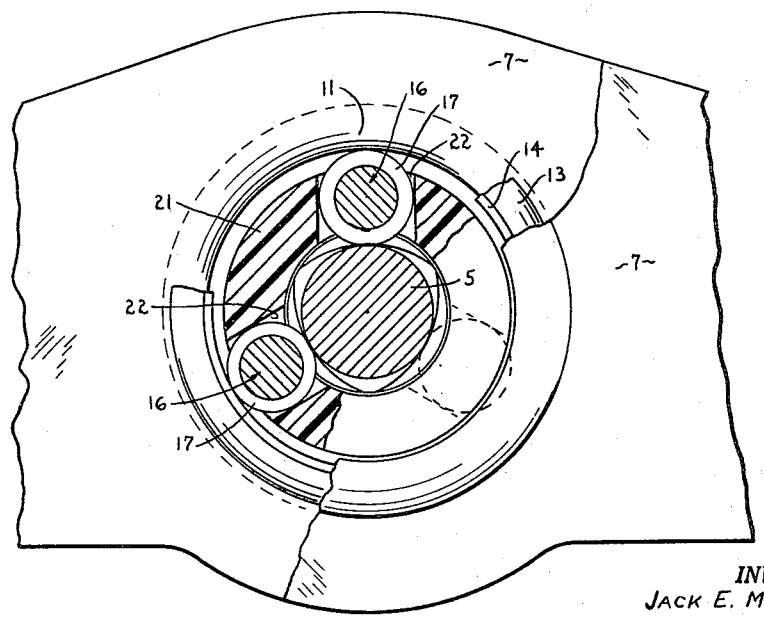
Figure 2 is a cross-sectional view partially broken away, of the assembly of Figure 1.

The invention is disclosed as one cooperating member of a combination of driving and driven members in which a helically threaded shaft constitutes the other member. Either member may be the driving member. Further, the driving member may itself be actuated by rotary motion to impart translatory motion to the driven member; or force may be applied to the driving member in a linear direction to impart rotary motion to the driven member.

In the embodiment illustrated, a nut assembly, generally indicated at 4, receives a threaded shaft 5 for relative rotational and axial movement. The nut assembly 4 comprises a case or mounting means formed of identical complementary collars 6. For economy, the collars may be fabricated from sheet metal. Each collar includes a plate or ledge portion 7 which is adapted to be fastened by screws or rivets 8 to the corresponding plate or ledge portion 7 of the other collar. Registering openings are formed in plates 7, and oppositely directed flanges extend from said openings to define generally tubular portions or sections 9 for telescopically receiving shaft 5. The outer end of each section 9 is turned inwardly to form rounded abutment surfaces, raceways, or shoulders 10, 10', generally radially inwardly disposed with respect to shaft 5. The opposite ends of sections 9 are joined to plates 7 by flared portions 11 defining therebetween a groove 12 which encircles the shaft 5. An insert, shown as a ring 13 of generally semicircular cross section, is nested in and retained by the walls of the groove 12. The shape of the periphery of ring 13 is not critical and may vary in contour so long as it fits into groove 12 for good abutting contact with the flared portions 11.

Suitable bearing elements 16 are interposed between the shaft 5 and the collars 6 of the mounting means to adapt the shaft and mounting means for relative rotational and axial movement and to transfer or transmit a load or force from the mounting means to the shaft, or vice versa. Preferably, elongate bearing elements are used, and are disposed parallel to the axis of the mounting means and are circumferentially spaced about the shaft 5. The respective end portions of all of the bearing elements terminate in common parallel planes which are normal to the axis of the shaft whereby parts of each bearing element engage with the ring 13 and with the abutment surfaces 10, 10'. The circumferential spacing of the bearing elements contribute to the balance and stabilization of the nut assembly.

Each element 16 has one or more radially enlarged preferably toroidally shaped bearing surfaces 17, 18, and 19, on each end thereof. The shaft 5 is illustrated as having three threads or a triple-lead thread with three bearing elements 16 mounted in the nut assembly such that one bearing surface 17 on one end of each bearing element 16 engages with a different thread on the shaft. In order for the bearing surface 17 of each bearing element 16 to lie in a common plane it is necessary that a proportional relationship exist between the number of threads and the number of bearing elements. In the illustrated form there is a proportional relationship of one to one, which could be two to one or the like.

The toroidal bearing surfaces serve a dual purpose: (1) The outermost toroidal bearing surfaces 17, 17 of each element are spaced apart a distance substantially equal to the axial distance between abutment surfaces or shoulders 10, 10' of the mounting means, so that elements 16 neatly nest within the area of the larger diameter of the mounting means. Since abutment surfaces 10, 10' are somewhat rounded relative to the axis of shaft 5, an external surface area of the bearing elements 17, 17 engage the shoulders 10, 10', and an internal surface area of the bearing surfaces 19, 19 engage with the ring 13, to limit axial movement between the mounting means and the bearing elements 16 with respect to shaft 5. (2) The toroidal bearing surfaces 17, 18, 19 engage adjoining threads of shaft 5 at spaced-apart points as shown in Figure 1 and, more particularly, have a rolling engagement with a side of the thread to effect the relative rotational and axial movement between the nut assembly and shaft 5.

The outwardly facing beveled edges 14, 14' of ring 13 are positioned in such a way that each edge will present a bearing surface or raceway oppositely disposed to one of the bearing surfaces or shoulders 10, 10'. The particular spacing of the shoulders 10, 10' and edges 14, 14', respectively, create in effect a pair of spaced ways around the inside of each collar 6, which, in the illustrated form, are adapted to receive in rolling contact the inner and outer toroidal bearing surfaces 17, 19 and 17, 19, respectively, arrnaged on opposite ends of elements 16. That is to say, outermost toroidal surfaces 17, 17 contact shoulders 10, 10' and the innermost pair of toroidal surfaces 19, 19 roll on edges 14, 14' of the ring. In the structure just described, the bearing elements 16 will transmit a load from the threads on shaft 5 in either direction to the mounting means 4 through at least two bearing surfaces 10, 14, or 10', 14'. When driving the mounting means to the left in Figure 1, the load will pass from the threads to elements 16 through both shoulder 10' and beveled portion 14' of the ring; and when driving the mounting means 4 in the opposite direction, the load will pass through shoulder 10 and beveled edge 14 of the ring.

The tubular cage member 21 fits between the mounting means 4 and the shaft 5, and has axially elongate openings 22 to receive bearing elements 16 and retain them in spaced relation about the periphery of shaft 5. Although the cage may be made of any suitable material, it has been found that material of the polyamide type, such as nylon or Teflon, are most satisfactory. The cage member 21 also maintains the axes of rotation of the bearing elements and the shaft in desired relation, usually a parallel relation. Openings 22 are of a size to rotatably receive the bearing elements 16, and the ends of the openings are reduced at 23 to receive the axle ends 24 of elements 16. The outside diameter of the cage member is slightly less than the inside diameter of the collars 6 at their inwardly turned ends, so that the cage 21 fits freely within the collars at these points to provide a substantially rattle-free assembly.

Figure 3:
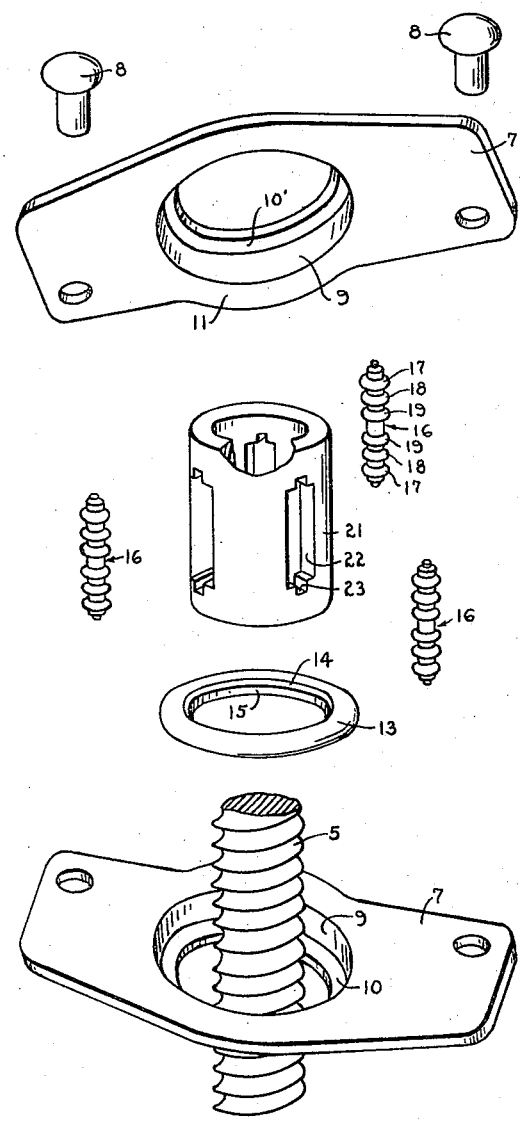
Figure 3 is an exploded view showing all of the parts of the improved nut assembly of Figures 1 and 2.

As is more or less apparent from Figure 3, in assembling the device ring 13 is placed in the groove 12 between the collars 6 prior to the operation of securing the plate portions 7 thereof together. The ring is thus clamped between the collars as part of the riveting operation. The cage 21 may now be inserted from either end of the mounting means. The bearing elements 16 are introduced through the bore of the cage and manipulated into openings 22, whereupon the threaded shaft can be threaded through the cage 21 and into engagement with the toroids on the bearing elements.

Ring 13 is of material sufficiently heavy to present fairly wide edges 14, 14' capable of withstanding considerable load thrust. The ring 13 is positioned centrally along the length of the bearing elements 16 such as to support the elements 16 against radial bowing in the middle which eliminates the possibility of elements 16 camming radially outwardly under load and wedging on the shaft. The collars 6, being identical and formed from sheet metal, can both be stamped from the same die, lending further to the economy of the present construction.

In the embodiment illustrated, the cage member 21 has openings to accommodate three rotatable elements 16, although more or less of these elements may be employed. In the same manner, shaft 5 is multithreaded and specifically contains three distinct threads. A greater or smaller number of the threads and corresponding bearing elements may be used in any given structure provided a proportioned predetermined relationship between the two is maintained. A multithreaded shaft is desirable to provide relatively fast axial travel of the nut assembly 4 when, for example, the shaft is rotated. In this manner, the bearing surfaces 17, 18, 19 of an element may each follow a different thread. One feature of the present structure is that at least one bearing element is provided for each thread thus permitting a plurality of enlarged bearing surfaces 17, 18, 19 to concurrently engage and transfer the drive from the threads to a pair of common abutment surfaces such as 10 or 10' and 14 or 14', respectively, formed in the mounting means.

A motion-transmitting device of the present invention has many applications. For one, the shaft 5 may be journaled at opposite ends and the ledge portions 7 of the nut assembly attached to a window of a vehicle in a manner illustrated and described in my Patent No. 2,714,005. As the shaft rotates in one direction or the other, the nut assembly travels up or down the shaft to regulate the position of the window. During rotation of the shaft 5, the rotatable elements, such as the elements 16, rotate in the openings 22 of the cage member 21 on their own axes while making rolling engagement with the thread of the shaft. The difference between the rate of planetation of the elements about the shaft and the rate of rotation of the shaft offers a mechanical advantage in the transmission of the motion.

The present structure provides a motion-transmitting mechanism having a plurality of load-transmitting shoulders and edge portions engaging with a portion of the toroidal surfaces on the bearing elements 16 such that in either direction of movement of the nut assembly 4 on the screw 5 the load will be transmitted through at least one shoulder 10, 10' and one edge portion 14, 14' of ring 13 from the shaft 5. This construction will distribute the load in such a way that only about half of the equivalent previous load will be carried by the contacting surfaces. The reduction in the amount of load carried by one toroidal surface and one shoulder will reduce the possibility of failure of the unit and will increase the load-carrying capacity of the device. The bearing elements 16 could be constructed with one, two, three, or more enlarged surfaces 17, 18, 19 on each end thereof and still operate within the scope of the present invention.

Another advantage of the present structure is its ability to "freewheel" when the cage strikes a stop or abutment. When, and so long as rotation of the cage is stopped relative to the shaft, the structure will permit the shaft and cage to continue to rotate together without further axial movement of the nut assembly along the shaft. With the threaded shaft or screw rotatably driven, but axially fixed, the cage may strike a stop so that axial movement of the cage and the tubular collars 6 of the nut assembly will be halted as the shaft and cage continue to rotate together about the axis of the shaft.

Although the foregoing disclosure describes a presently preferred embodiment of my invention, it is to be understood that the invention may be practiced in still other forms within the scope of the following claims.

I claim:

1. A nut assembly for engaging a threaded shaft comprising a casing formed of two identical complementary sheet-metal stampings, each stamping including a plate portion secured in abutting relation to the plate portion of the complementary stamping, said plate portions having registering openings formed therethrough, oppositely directed tubular sections extending from said openings and each joined to its respective plate portion by an outwardly flared portion, said flared portions forming a channel therebetween, the outer ends of each tubular section being turned inwardly to form thrust-bearing surfaces, a ring fixedly held in said channel, the sides of said ring presenting thrust-bearing surfaces opposed to the thrust-bearing surfaces at the outer ends of the sections, a cage extending through said tubular sections, and elongate bearing elements arranged in openings formed in the walls of said cage, each element being provided with one or more toroids adjacent each end thereof and so spaced that the outermost toroids contact the thrust surfaces at the ends of said sections and the innermost toroids contact the sides of said ring.

2. A nut assembly for engaging a threaded member including a mounting comprised of mating stamped metal parts, each having a tubular section with an inturned shoulder portion near the outer end thereof, a one-piece ring fixed centrally of the inner surface of the mounting and defining a second set of shoulder portions opposing the first shoulder portions, and rotatable bearing elements within the mounting having radially enlarged bearing surfaces engaging said ring, said end shoulder portions and said threaded member for providing a driving connection between the assembly and the threaded member.

3. A nut assembly comprising a tubular mounting having its ends turned inwardly to define thrust-bearing surfaces, the mid-portion of the inner surface of said mounting being formed with a channel extending therearound, a ring fixedly retained in said channel with its sides presenting abutment surfaces facing the thrust-bearing surfaces at the ends of the mounting, and rotatable elements within the mounting having radially enlarged surfaces adjacent each end thereof engaging both sides of said ring and said thrust-bearing surfaces.

4. A nut assembly for engaging a threaded member including a tubular mounting adapted to be disposed about the member and having end portions of reduced diameter to form shoulder portions, insert means fixed to the inner mid-portion of said mounting, said insert being in the general shape of a plain ring, bearing elements within the mounting and each having radially enlarged bearing surfaces adjacent each end thereof for simultaneously engaging said shoulder portions, the sides of said ring, and the thread of the member, and means to space the bearing elements peripherally of the threaded member.

5. A load-bearing assembly comprising a tubular nut member formed of two sections secured together in end-to-end relation, the outer ends of said sections having oppositely offset, opposed portions defining raceways, the abutting ends of said sections each presenting a relieved portion forming a channel therebetween, a ring seated in said channel, an axially slotted carrier member rotatably positioned within said nut member, and roller means positioned in the carrier member and bearing against said raceways and ring from both axial directions.

6. The structure as defined in claim 5, wherein said ring is of the general shape of a plain band, and the sides of said band are beveled toward the inner wall thereof at an angle of the order of 45 degrees to define bearing surfaces for engagement with said roller means.

7. The structure as defined in claim 6, wherein a threaded shaft extends through said load-bearing assembly, and the roller means engage with the threads on said shaft whereby rotation of said shaft moves the load-bearing assembly along the axis of the shaft.

No references cited.

UNITED STATES PATENT OFFICE
CERTIFICATE OF CORRECTION

Patent No. 2,924,112                          February 9, 1960

Jack E. Martens

It is hereby certified that error appears in the printed specification of the above numbered patent requiring correction and that the said Letters Patent should read as corrected below.

Column 1, line 56, after "view" insert a comma; column 3, line 2, for "arrnaged" read -- arranged --; column 4, line 1, strike out "my"; line 2, after "005" and before the period insert -- to R. H. Wise --.

Signed and sealed this 26th day of July 1960.

(SEAL)
Attest:

KARL H. AXLINE
Attesting Officer

ROBERT C. WATSON
Commissioner of Patents